June 22, 1937.  C. F. DREW, JR  2,084,577
DISTANCE INDICATOR FOR TELESCOPES
Filed Nov. 26, 1935
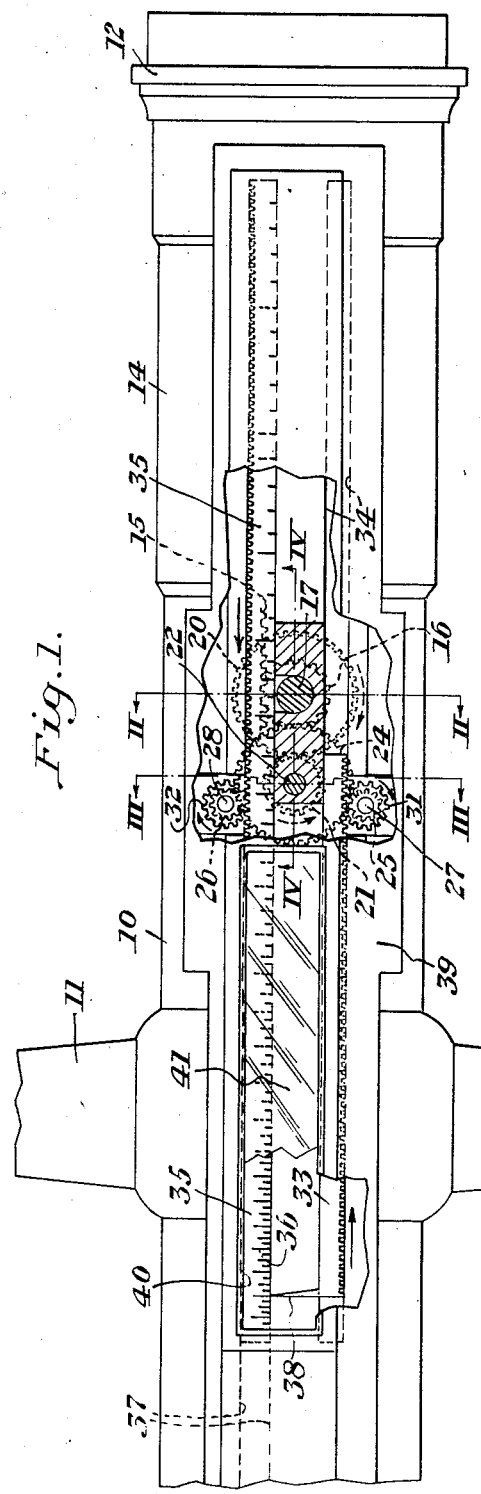
INVENTOR
Charles F. Drew, Jr.
by his attorneys
Stebbins, Blenko & Parmelee Patented June 22, 1937

2,084,577

UNITED STATES PATENT OFFICE 2,084,577

DISTANCE INDICATOR FOR TELESCOPES

Charles F. Drew, Jr., Dormont, Pa.

Application November 26, 1935, Serial No. 51,647

4 Claims. (Cl. 88—32)

My invention relates to telescopes and, in particular, to an attachment for indicating the distance from a telescope to the object on which it is focused.

In many cases, it is desirable to know the distance from a point of observation to an object viewed through a telescope, particularly in surveying, although other applications will doubtless occur to those skilled in the art. Heretofore, in surveying, particularly in stadia measurements, it has been necessary to send out a rodman with a stadia rod to the point, the distance of which is to be determined.

I have invented an attachment for telescopes which indicates directly the distance from the telescope to the object on which it is focused. This device greatly facilitates the measurement of distances not only in the field of surveying and stadia measurements, but also in range finding and astronomical observations. In accordance with my invention, I provide the telescope with movable indicating means actuated by the mechanism which is ordinarily used to adjust the focus of the telescope. The mechanism may take any convenient form, but in that to be described in detail herein, it comprises a movable scale and a movable pointer geared to the focusing means, i. e., the objective adjusting shaft. While the invention will be described as applied to a surveyor's transit, it will be apparent that it may be incorporated in any telescope which is focused by adjusting the relative positions of the eye-piece and objective.

A preferred form of the invention is illustrated in the accompanying drawing, although it will be apparent that the invention may be otherwise embodied within the scope of my broader claims.

In the drawing:

Figure 1 is a partial plan view of a surveyor's transit having the invention embodied therein, parts being shown in section;

Figure 2 is a transverse sectional view along the line II—II of Fig. 1;

Figure 3 is a similar view along the line III—III of Fig. 1; and

Figure 4 is a partial longitudinal section along the line IV—IV of Fig. 1.

Referring now in detail to the drawing, a transit telescope 10 is supported on trunnions 11 providing a horizontal axis of rotation. An objective cell 12 is slidably supported on an objective slide or tube 13 reciprocable in the tube 10. A dust guard tube 14 extends rearwardly of the objective cell 12 on the outside of the main tube 10. The eye-piece is mounted at the end of the tube 10 opposite the objective cell 12, in the usual manner.

A rack bar 15 is secured to the inside of the objective slide 13 and is adapted to be engaged by a pinion 16. The pinion 16 is secured to a shaft 17 journaled vertically in a bearing 18 mounted on the main tube 10. At the upper end of the shaft 17 a knurled wheel 19 is provided to permit manual adjustment of the slide 13 in the tube 10 for focusing the telescope.

The shaft 17 is also provided with a gear 20. The gear 20 meshes with a pinion 21 secured to a shaft 22. The shaft 22 is journaled in bearings 23 mounted on the tube 10 in the same manner as the bearing 18. The shaft 22 is also provided with a gear 24 meshing with pinions 25 and 26. These pinions are secured on shafts 27 and 28 journaled in bearings 29 and 30. The shafts 27 and 28 are also provided with pinions 31 and 32.

The pinion 31 meshes with rack teeth formed on a pointer slide 33 movable in guides 34 longitudinally of the telescope. Similarly, a slide 35 having a graduated scale 36 thereon is movable in longitudinal guides 37. The slide 33 carries a pointer or index 38 cooperating with the graduated scale on the slide 35, and has rack teeth in mesh with the pinion 32. The mechanism already described is enclosed in a housing 39 and may, if desired, be made detachable as a unit from the telescope. The housing 39 has a window 40 therein provided with a magnifying lens 41 through which the relative positions of the index and scale may be observed, and a reading taken.

It will be apparent from the description given thus far that operation of the shaft 17 by means of the wheel 19, to effect a focusing adjustment of the objective, will cause an increased, though proportional, movement of the slides 33 and 35 and that these slides will move in opposite directions, as indicated by the arrows in Fig. 1. In accordance with well-known optical laws, the distance between the objective and the eye-piece bears a definite relation to the distance from the telescope to the object on which it is focused. The scale 36 may therefore be graduated in any suitable units, whereby the distance from the telescope to an object on which it is focused may be determined by noting the position of the index 38 relative to the scale 36. The use of multiplying gears between the focus-adjusting means and the indicating slides and the considerable length of the scale 36 provide an accuracy of measurement which is sufficient for many purposes, comparing favorably, for example, with the accuracy of stadia measurements. The scale 36, it will be noted, is not uniform. Greater accuracy, therefore, is obtainable for short distances than for long distances, but measurements may be made to within about one foot, even at distances of approximately 1000 feet, so that the percentage of error is very small.

The advantages of the invention described will be obvious immediately. Among them may be mentioned the great increase in the speed at which measurements may be made for map making, contour work, and the like, since the services of a rodman are dispensed with altogether, and the only delay involved in making an observation, represented by the time necessary to focus the telescope. Applications of the invention other than to the art of surveying will readily suggest themselves, such as range finding, astronomical work, and the like. While the invention has been specifically described herein as embodied in the telescope of a surveyor's transit, it will be understood that the specific structure disclosed is merely by way of example and not a limitation upon the invention. Other specific forms of the device may, of course, be resorted to without departing from the spirit of the invention or the scope of the appended claims.

I claim:

1. A telescope comprising a tube, an objective cell reciprocable therein, means for manually reciprocating the cell in the tube, a graduated scale slidable on said tube, a pointer bar also slidable on said tube and having a pointer adapted to cooperate with said scale, and multiplying gearing for actuating said pointer bar and scale in opposite directions, said gearing being driven by said means.

2. A telescope comprising a tube, an objective cell reciprocable therein, a shaft journaled in said tube, means whereby rotation of said shaft effects adjustment of the cell relative to the tube to focus the telescope, a graduated scale slidable along said tube, a bar also slidable along the tube and having a pointer cooperating with said scale, said bar and scale having rack teeth thereon, shafts rotatably mounted on said tube having pinions thereon meshing with said rack teeth, and multiplying gearing between said last-mentioned shafts and said first-mentioned shaft.

3. A telescope comprising a tube, an objective cell reciprocable therein, means including a rotatable shaft for reciprocating the cell in the tube, a graduated scale movably mounted on said tube, a pointer bar also movable on the tube and adapted to cooperate with said scale, rack teeth on said bar and scale, shafts journaled in the tube having pinions thereon meshing with said teeth, and multiplying gearing between said last-mentioned shafts and said first-mentioned shaft.

4. In a telescope comprising a tube, an objective cell reciprocable therein, a scale slidable along said tube, a pointer bar also slidable along the tube and having a pointer adapted to cooperate with said scale, a shaft rotatably mounted on the tube for adjusting the cell relative to the tube, rack teeth on said scale and pointer bar, shafts rotatably mounted on the tube having pinions meshing with said teeth, and gearing between said last-mentioned shafts and said first-mentioned shaft.

CHARLES F. DREW, Jr.